United States Patent
Park et al.

(10) Patent No.: US 8,660,076 B2
(45) Date of Patent: Feb. 25, 2014

(54) APPARATUS AND METHOD OF TRANSMITTING SCHEDULING REQUEST IN WIRELESS COMMUNICATION SYSTEM

(75) Inventors: Sung Jun Park, Anyang-si (KR); Sung Duck Chun, Anyang-si (KR); Sung Hoon Jung, Anyang-si (KR); Seung June Yi, Anyang-si (KR); Young Dae Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 13/208,269

(22) Filed: Aug. 11, 2011

(65) Prior Publication Data

US 2012/0039278 A1 Feb. 16, 2012

Related U.S. Application Data

(60) Provisional application No. 61/373,256, filed on Aug. 12, 2010, provisional application No. 61/389,669, filed on Oct. 4, 2010.

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| | | | |
|---|---|---|---|
| 2008/0233964 A1* | 9/2008 | McCoy et al. | 455/450 |
| 2010/0098012 A1* | 4/2010 | Bala et al. | 370/329 |
| 2011/0141928 A1* | 6/2011 | Shin et al. | 370/252 |
| 2012/0113914 A1* | 5/2012 | Zhao et al. | 370/329 |
| 2012/0182949 A1* | 7/2012 | Aiba et al. | 370/329 |
| 2012/0307773 A1* | 12/2012 | Tiirola et al. | 370/329 |

* cited by examiner

*Primary Examiner* — Dang Ton
*Assistant Examiner* — Ronald H Davis
(74) *Attorney, Agent, or Firm* — Lee, Hong, Degerman, Kang & Waimey

(57) ABSTRACT

A method and apparatus of transmitting a scheduling request to request uplink resources are provided. A user equipment receives a scheduling request (SR) configuration and a transmission indicator from a first serving cell. The transmission indicator enables the simultaneous transmission of the SR and a physical uplink shared channel (PUSCH). The user equipment transmits a SR on a physical uplink control channel (PUCCH) in a subframe to the first serving cell and transmits uplink data on the PUSCH in the subframe to a second serving cell.

16 Claims, 12 Drawing Sheets

FIG. 8
(PRIOR ART)
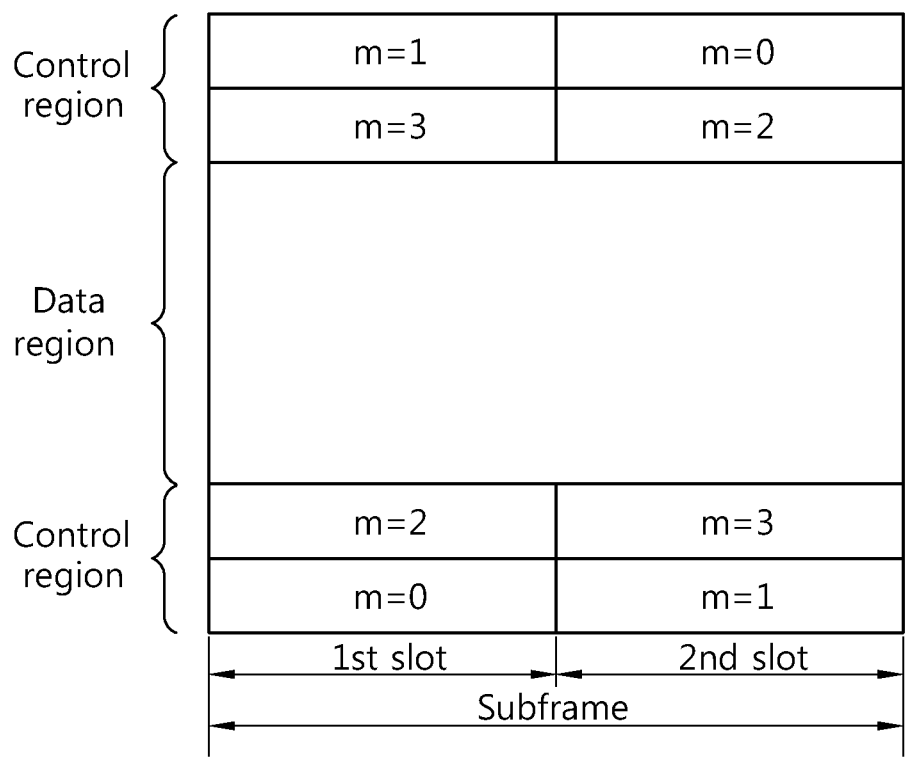
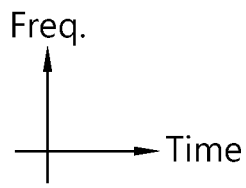

APPARATUS AND METHOD OF TRANSMITTING SCHEDULING REQUEST IN WIRELESS COMMUNICATION SYSTEM

CROSS-REFERENCE TO RELATED APPLICATIONS

Pursuant to 35 U.S.C. §119(e), this application claims the benefit of U.S. Provisional Patent Application Ser. No. 61/373,256 filed on Aug. 12, 2010, and 61/389,669 filed on Oct. 4, 2010, the contents of which are all incorporated by reference herein in their entirety.

BACKGROUND OF THE INVENTION

1. Field of the Invention

The present invention relates to wireless communications, and more particularly, to a method and apparatus of transmitting a scheduling request to request uplink resources in a wireless communication system

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A scheduling request (SR) is a control signal transmitted by a user equipment to a base station to request allocation of an uplink resource. Delay of SR transmission implies delay of the uplink resource allocation, which may cause deterioration in service quality.

Recently, with the introduction of multiple carriers, one user equipment can receive a service from a plurality of serving cells. With the introduction of the plurality of serving cells, there is a need for a method capable of more effectively scheduling SR transmission.

SUMMARY OF THE INVENTION

The present invention provides a method and apparatus for transmitting a scheduling request in a wireless communication system.

In an aspect, a method of transmitting a scheduling request to request uplink resources in a wireless communication system is provided. The method includes receiving, by a user equipment, a scheduling request (SR) configuration from a first serving cell, the SR configuration including an resource index and a SR index indicating a periodicity for SR transmission, receiving, by the user equipment, a transmission indicator which enables the simultaneous transmission of the SR and a physical uplink shared channel (PUSCH), transmitting, by the user equipment, a SR on a physical uplink control channel (PUCCH) by using a resource indicated by the resource index in a subframe to the first serving cell, and transmitting, by the user equipment, uplink data on the PUSCH in the subframe to a second serving cell.

Transmission indicator may be included in the SR configuration.

The subframe may be determined among subframes which belong to the periodicity for SR transmission.

The method may further include receiving, by the user equipment, an uplink grant from the first serving cell or the second serving cell, the uplink grant including a resource used for the PUSCH.

In another aspect, an apparatus of transmitting a scheduling request to request uplink resources in a wireless communication system is provided. The apparatus includes a radio frequency unit for transmitting and receiving radio signals, and a processor operatively coupled with the radio frequency unit and configured for receiving a scheduling request (SR) configuration from a first serving cell, the SR configuration including an resource index and a SR index indicating a periodicity for SR transmission, receiving a transmission indicator which enables the simultaneous transmission of the SR and a physical uplink shared channel (PUSCH), transmitting a SR on a physical uplink control channel (PUCCH) by using a resource indicated by the resource index in a subframe to the first serving cell, and transmitting uplink data on the PUSCH in the subframe to a second serving cell.

BRIEF DESCRIPTION OF THE DRAWINGS

FIG. 8 is a diagram showing an example of an UL subframe in the 3GPP LTE.

DESCRIPTION OF EXEMPLARY EMBODIMENTS

Figure 1:
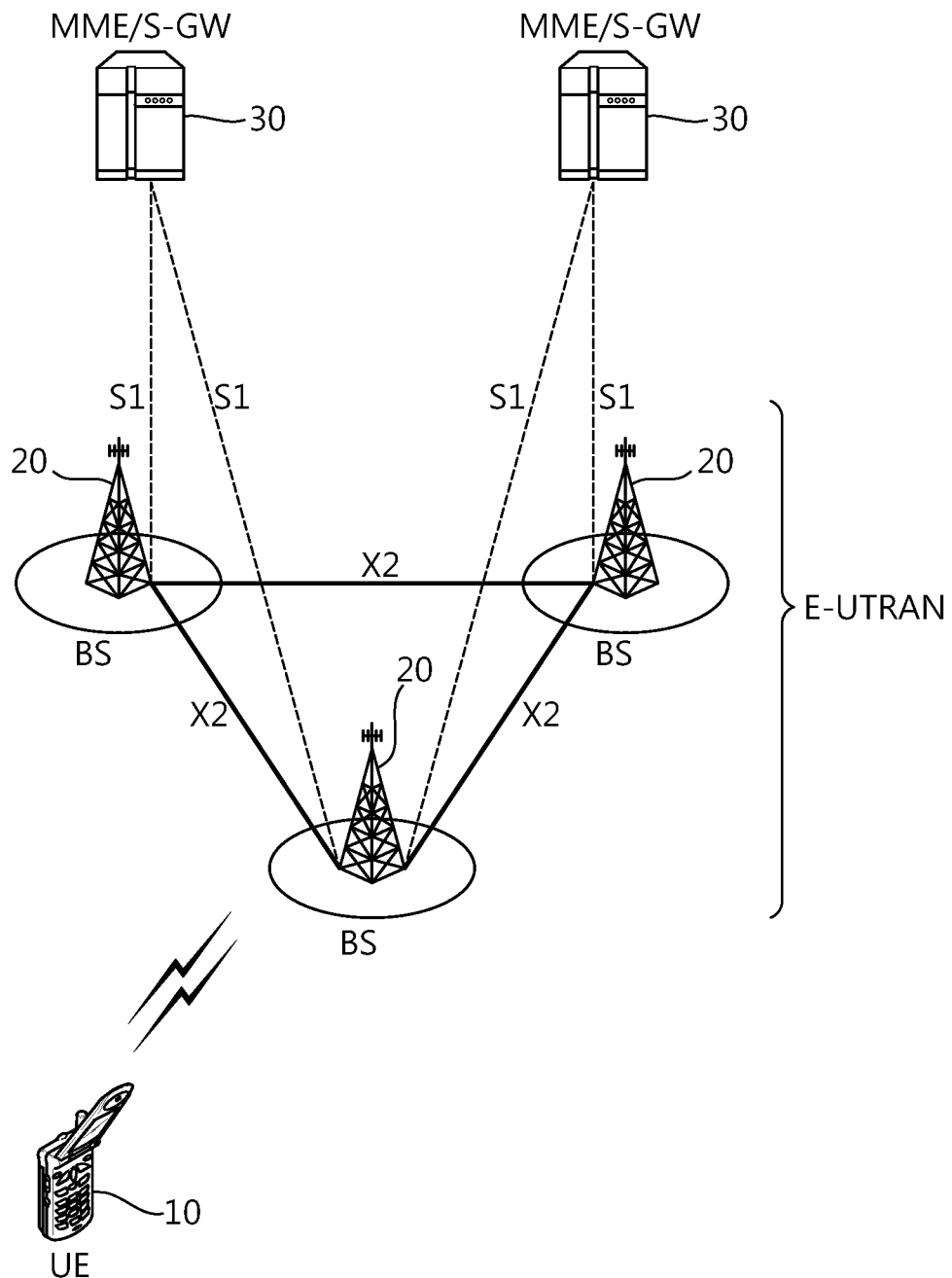
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
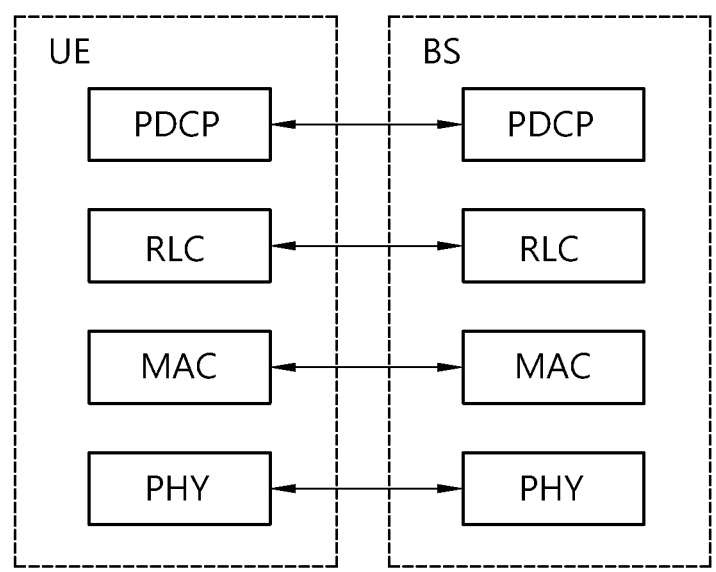
FIG. 2 is a diagram showing a radio protocol architecture for a user plane.
Figure 3:
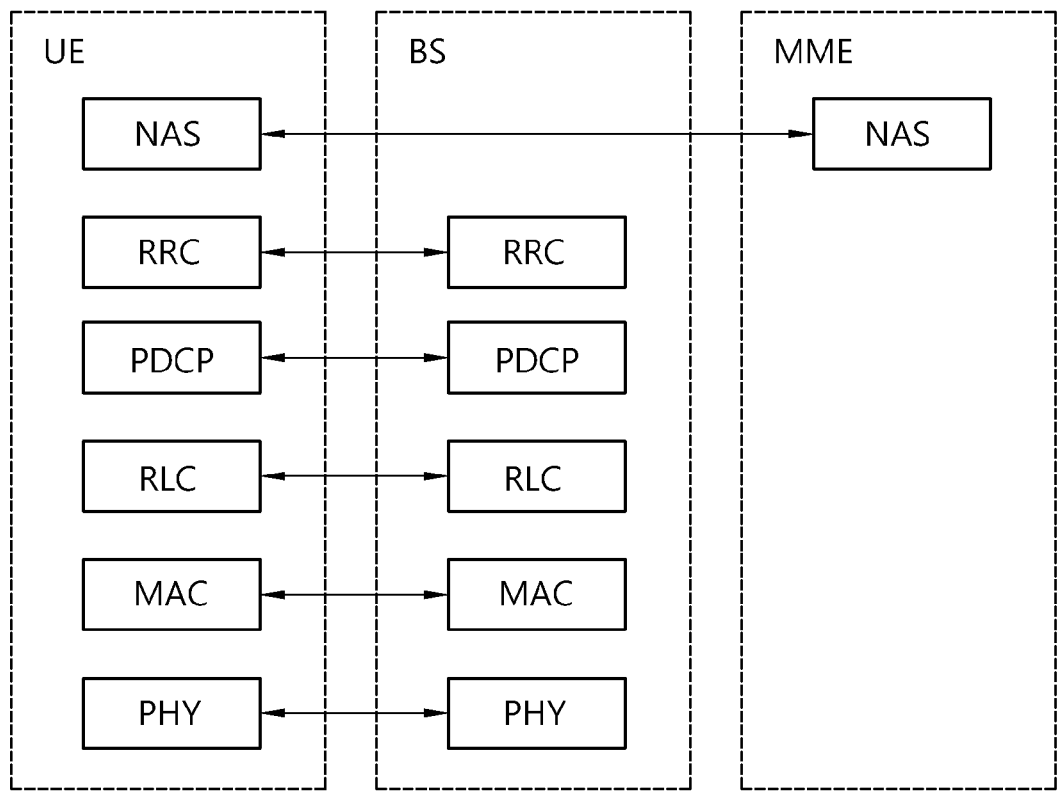
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

As disclosed in 3GPP TS 36.211 V8.7.0, the 3GPP LTE classifies physical channels into a data channel, i.e., a physical downlink shared channel (PDSCH) and a physical uplink shared channel (PUSCH), and a control channel, i.e., a physical downlink control channel (PDCCH), Physical Control Format Indicator Channel (PCFICH), Physical Hybrid-ARQ Indicator Channel (PHICH) and a physical uplink control channel (PUCCH).

Now, a multiple carrier system will be described.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 4:
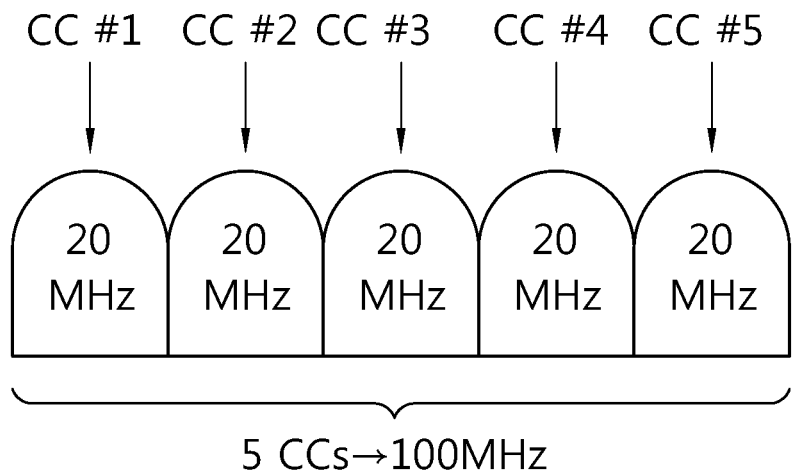
FIG. 4 shows an example of multiple carriers.

FIG. 4 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 5:
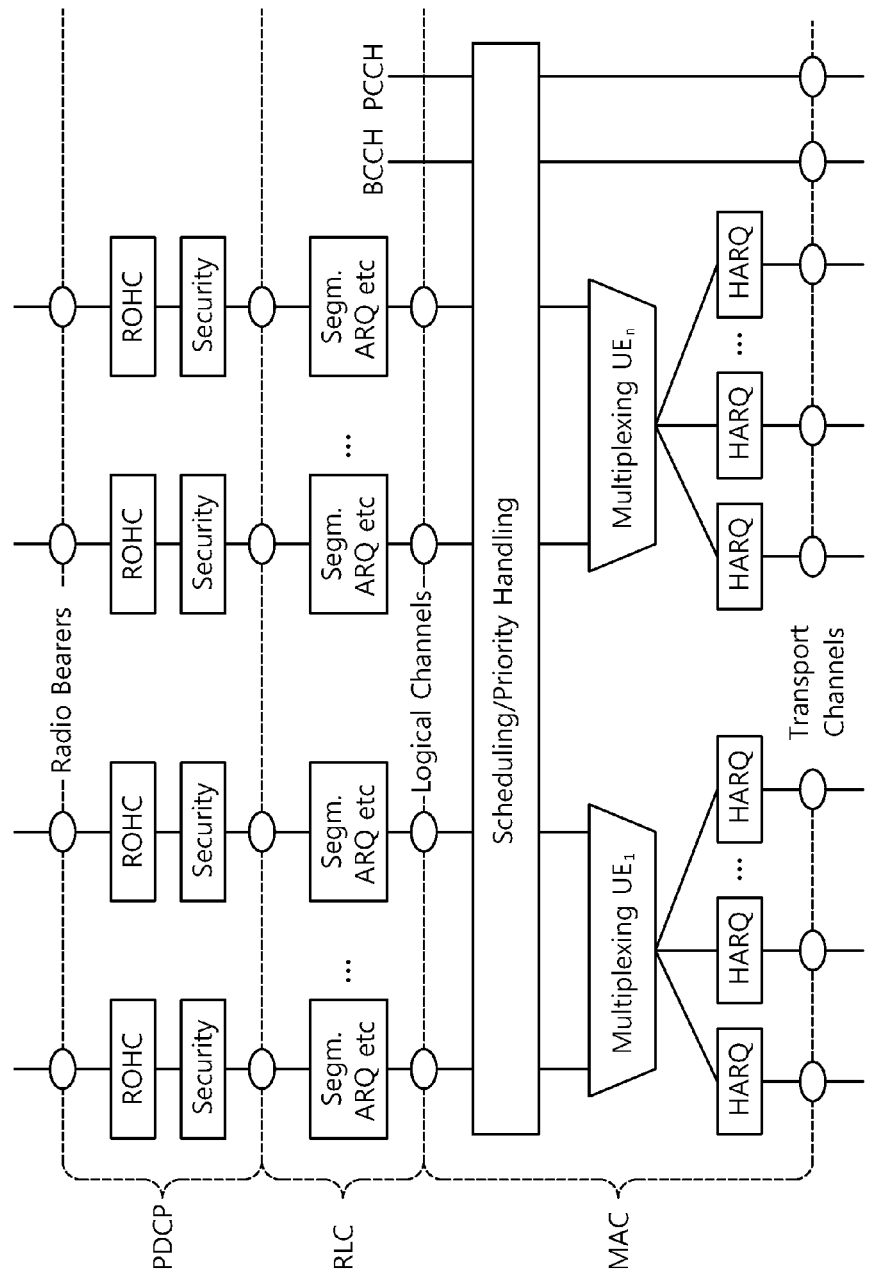
FIG. 5 shows a second-layer structure of a BS for multiple carriers.
Figure 6:
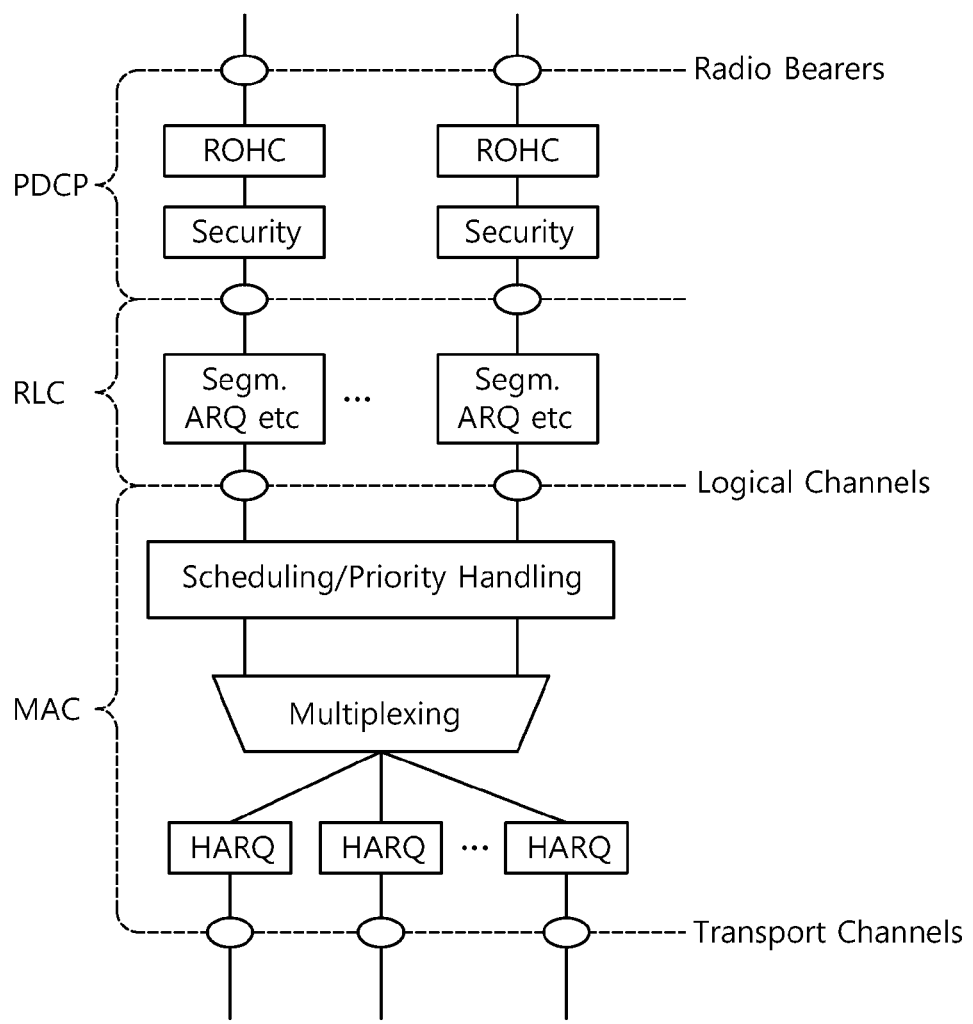
FIG. 6 shows a second-layer structure of a UE for multiple carriers.

FIG. 5 shows a second-layer structure of a BS for multiple carriers. FIG. 6 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block on a transport channel. Therefore, a plurality of HARQ entities can transmit or receive a plurality of transport blocks through a plurality of CCs.

One CC (or a CC pair of a downlink CC and an uplink CC) may correspond to one cell. When a synchronous signal and system information are provided by using each downlink CC, it can be said that each downlink CC corresponds to one serving cell. When the UE receives a service by using a plurality of downlink CCs, it can be said that the UE receives the service from a plurality of serving cells.

The BS can provide the plurality of serving cells to the UE by using the plurality of downlink CCs. Accordingly, the UE and the BS can communicate with each other by using the plurality of serving cells.

A cell may be classified into a primary cell and a secondary cell. The primary cell is always activated and is operated in a primary frequency. In the primary cell, the UE either performs the initial connection establishment procedure or initiates the connection re-establishment procedure. The secondary cell may be activated or inactivated and is operated in a secondary frequency. The secondary cell may be configured once an RRC connection is established and may be used to provide additional radio resources. The primary cell may be configured with a pair of DL CC and UL CC. The secondary cell may be configured with a pair of DL CC and UL CC or a DL CC only. Serving cells include one or more primary cells and zero or more secondary cells.

Hereinafter, uplink (UL) scheduling in a 3GPP LTE system will be described.

In UL transmission, if a UE does not report information on UL data to a BS, the BS cannot know an amount of UL radio resources required by each UE. Therefore, in order for the BS to be able to allocate the UL radio resource to the UE, the UE provides the BS with information required for radio resource scheduling.

A buffer status report (BSR) is for reporting from the UE to the BS an amount of data stored in a buffer of the UE. The BSR is generated in a format of a MAC control element, and is transmitted from the UE to the BS by being included in a MAC PDU. Since the MAC PDU is transmitted on a PUSCH in a PHY layer, UL resource allocation is required to send the BSR.

A scheduling request (SR) is a control signal transmitted from the UE to the BS to request the UL radio resource.

Figure 7:
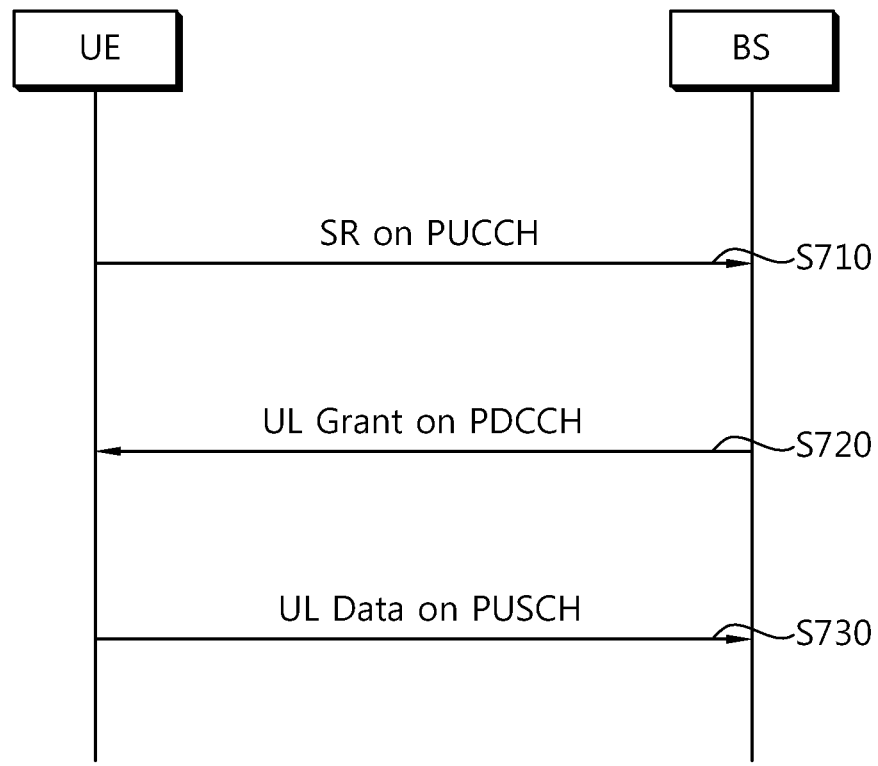
FIG. 7 shows an example of SR transmission.

FIG. 7 shows an example of SR transmission.

If UL data exists, a UE triggers a BSR, and also triggers an SR. When the SR is triggered, the UE transmits the SR on a PUCCH (step S710). A PUCCH resource for the SR is pre-allocated.

Upon receiving the SR, a BS transmits a UL grant including a UL radio resource to be allocated on a PDCCH (step S720).

The UE transmits UL data on a PUSCH by using the UL radio resource (step S730).

FIG. 8 is a diagram showing an example of an UL subframe in the 3GPP LTE.

One subframe consists of 2 slots. A time required for transmitting one subframe is defined as a transmission time interval (TTI). One slot may include a plurality of orthogonal frequency division multiplexing (OFDM) symbols in a time domain. Since the 3GPP LTE uses orthogonal frequency division multiple access (OFDMA) in a DL, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

A UL subframe can be divided into a control region to which a physical uplink control channel (PUCCH) carrying uplink control information is allocated and a data region to which a physical uplink shared channel (PUSCH) carrying uplink data is allocated.

A PUCCH for a UE is allocated in a pair of resource blocks in a subframe. Resources blocks belonging to the resource block-pair occupy different subcarriers in a first slot and a second slot. In FIG. 8, m is a position index indicating a logical frequency region position of the resource block pair, allocated to PUCCHs within the uplink subframe. FIG. 8 shows that resource blocks having the same m value occupy different subcarriers in the two slots.

In accordance with 3GPP TS 36.211 V8.5.0 (2008-12), a PUCCH supports a multiple formats. PUCCHs having different numbers of bits per subframe can be used in accordance with a modulation scheme dependent on a PUCCH format.

The PUCCH format 1 is used to transmit an SR (Scheduling Request), the PUCCH formats 1a/1b are used to transmit an ACK/NACK signal for an HARQ, the PUCCH format 2 is used to transmit a CQI, and each of the PUCCH formats 2a/2b is used to simultaneously transmit a CQI and an ACK/NACK signal.

Each of all the PUCCH formats uses the cyclic shift (CS) of a sequence in each OFDM symbol. The cyclic-shifted sequence is generated by cyclically shifting a base sequence by a specific CS amount. The specific CS amount is indicated by a CS index.

An example in which the base sequence $r_u(n)$ is defined is shown as:

$$r_u(n) = e^{jb(n)\pi/4} \quad \text{[Equation 1]}$$

where u indicates a root index, n indicates an element index where $0 \leq n \leq N-1$, and N indicates the length of the base sequence. b(n) is defined in section 5.5 of 3GPP TS 36.211 V8.7.0.

The length of the base sequence is equal to the number of elements included in the base sequence. u can be determined based on a cell ID (identifier) or a slot number within a radio frame. Assuming that the base sequence is mapped to one resource block in the frequency domain, the length of the base sequence N is 12 because one resource block includes 12 subcarriers. A different base sequence can be defined on the basis of a different root index.

A cyclic-shifted sequence $r(n, I_{CS})$ can be generated by cyclically shifting the base sequence r(n) as shown:

$$r(n, I_{cs}) = r(n) \cdot \exp\left(\frac{j2\pi I_{cs} n}{N}\right), \quad 0 \leq I_{cs} \leq N-1 \quad \text{[Equation 2]}$$

where $I_{CS}$ is a CS index indicating the CS amount ($0 \leq I_{CS} \leq N-1$).

Hereinafter, available CS indices of the base sequence refer to CS indices that can be derived from the base sequence on the basis of a CS interval. For example, assuming that the length of the base sequence is 12 and the CS interval is 1, a total number of available CS indices of the base sequence is 12. Assuming that the length of the base sequence is 12 and the CS interval is 2, the number of available CS indices of the base sequence is 6.

Figure 9:
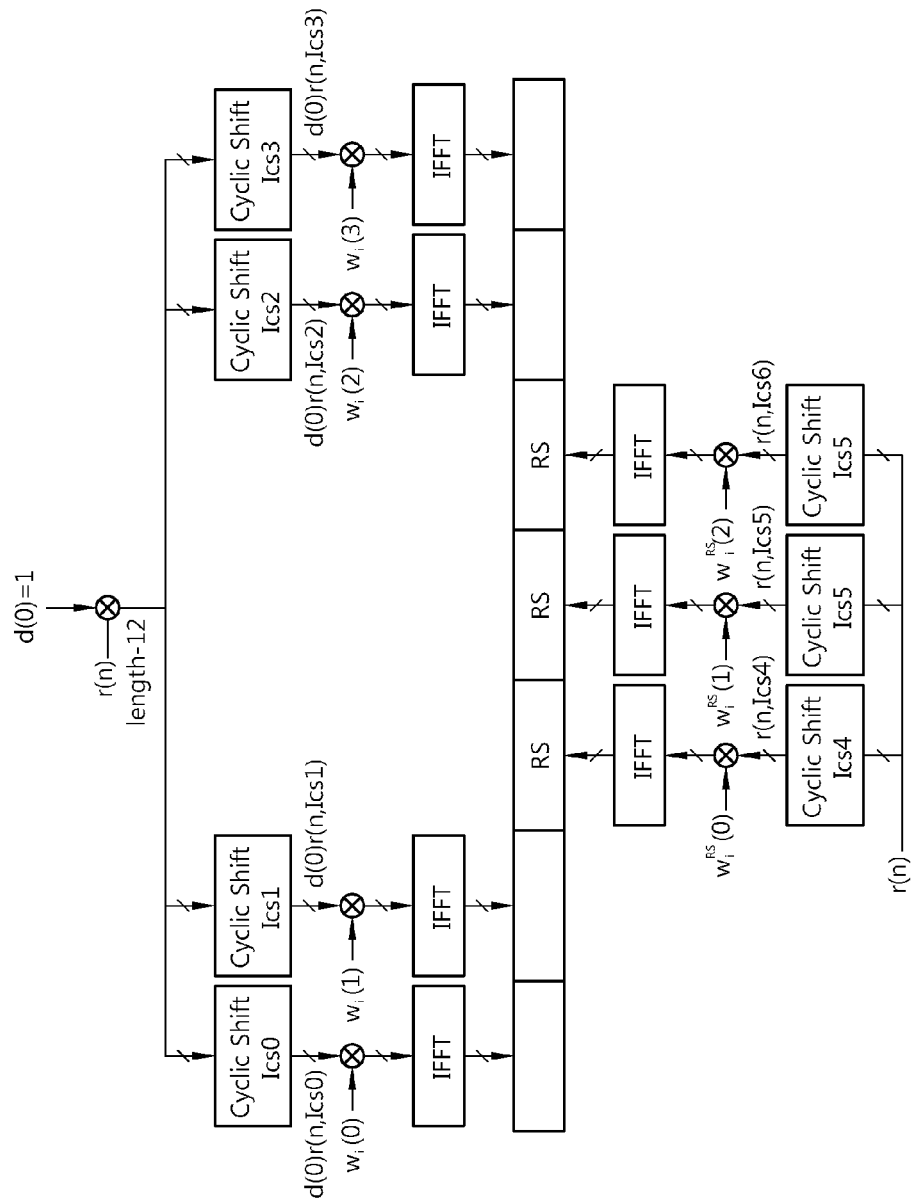
FIG. 9 is a diagram showing the PUCCH for SR in a normal CP in the 3GPP LTE.

FIG. 9 is a diagram showing the PUCCH for SR in a normal CP in the 3GPP LTE. On slot includes 7 OFDM symbols. 7 OFDM symbols are divided into 3 reference signal (RS) OFDM symbols and 4 data OFDM symbols.

When a SR is triggered, a symbol d(0) is set to 1.

The CS index $I_{CS}$ can vary depending on a slot number ($n_S$) within a radio frame or a symbol index (l) within a slot or both.

Since there are 4 data OFDM symbols used for transmission of the symbol d(0) in the normal CP, it is assumed that CS indexes corresponding to 4 data OFDM symbols are $I_{CS0}$, $I_{CS1}$, $I_{CS2}$ and $I_{CS3}$.

The symbol d(0) is spread with a cyclic-shifted sequence $r(n, I_{CS})$. Assuming one-dimensional spread sequence corresponding to an (i+1)th OFDM symbol in a subframe is m(i), for i=0, 1, 2, 3, it can be expressed as:

$$\{m(0),m(1),m(2),m(3)\}=\{d(0)r(n,I_{CS0}),d(0)r(n,I_{CS1}),d(0)r(n,I_{CS2}),d(0)r(n,I_{CS3})\}.$$

To increase UE capacity, the one-dimensional spread sequence can be spread using an orthogonal sequence.

An orthogonal sequence $w_i(k)$, where i is a sequence index and $0 \leq k \leq K-1$, having a spreading factor K=4 may use the following sequence.

TABLE 1

| Index (i) | $[w_i(0), w_i(1), w_i(2), w_i(3)]$ |
|---|---|
| 0 | [+1, +1, +1, +1] |
| 1 | [+1, −1, +1, −1] |
| 2 | [+1, −1, −1, +1] |

The orthogonal sequence $w_i(k)$, where i is a sequence index and $0 \leq k \leq K-1$, having a spreading factor K=3 may use the following sequence.

TABLE 2

| Index (i) | $[w_i(0), w_i(1), w_i(2)]$ |
|---|---|
| 0 | [+1, +1, +1] |
| 1 | $[+1, e^{j2\pi/3}, e^{j4\pi/3}]$ |
| 2 | $[+1, e^{j4\pi/3}, e^{j2\pi/3}]$ |

A different spreading factor can be used for each slot.

Accordingly, assuming that a certain orthogonal sequence index i is given, 2-dimensional spread sequences s(0), s(1), s(2), s(3) can be expressed as follows:

$$\{\{s(0),s(1),s(2),s(3)\}=\{w_i(0)m(0),w_i(1)m(1),w_i(2)m(2),w_i(3)m(3)\}.$$

The two-dimensional spread sequences {s(0), s(1), s(2), s(4)} are subject to IFFT and then transmitted through corresponding OFDM symbols. Accordingly, the SR is transmitted on the PUCCH.

An orthogonal sequence index i, a cyclic shift index $I_{CS}$, and a resource block index m are parameters required to configure the PUCCH and are also resources used to identify the PUCCH (or UE).

In the 3GPP LTE, a resource index $n^{(1)}_{PUUCH}$ is defined in order for the UE to obtain the three parameters for configuring the PUCCH. For the SR, the resource index $n^{(1)}_{PUUCH}$ is configured by a higher layer signal.

Simultaneous transmission of the PUSCH and the SR is disabled in the conventional 3GPP LTE. This is to improve a peak-to-average power ratio (PAPR) property by maintaining a single-carrier property.

However, by disabling simultaneous transmission of the PUSCH and the SR, service quality may deteriorate when a plurality of serving cells exist.

Figure 10:
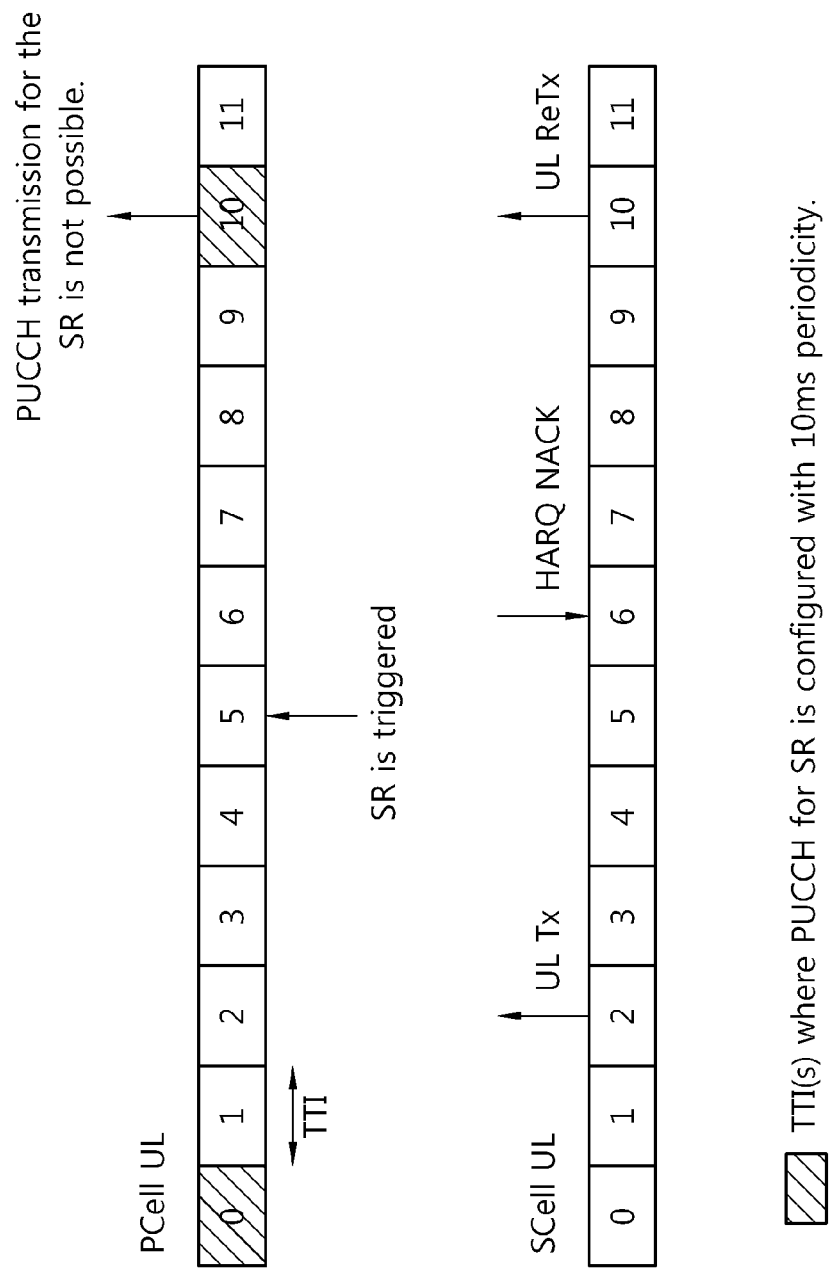
FIG. 10 shows a problem of SR transmission in a multi-cell environment.

FIG. 10 shows a problem of SR transmission in a multi-cell environment.

It is assumed that there are two serving cells, i.e., a primary cell (PCell) and a secondary cell (SCell). One PCell and a plurality of SCells can be used.

It is assumed that a periodicity of an SR is 10 ms, that is, 10 subframes.

UL HARQ is performed in the SCell, and a UE retransmits UL data to the SCell in a subframe having an index 10. However, new UL data is also generated in the PCell, and thus the SR needs to be transmitted in the subframe having the index 10.

Since simultaneous transmission of the SR and a PUSCH is disabled at present, the UE inevitably waits for a next chance of SR transmission. This may result in service delay.

According to the proposed invention, a BS enables simultaneous transmission of the PUSCH and a PUCCH to the UE, and allocates a PUCCH resource for the SR. In a case where PUCCH transmission is necessary for the SR, the UE can perform transmission of the PUCCH irrespective of whether the PUSCH is transmitted at the same time of transmitting the PUCCH.

The case where the UE requires PUCCH transmission for the SR may be a case where the UE triggers the SR and thus the SR is pending but there is no UL radio resource.

The SR on the PUCCH can be transmitted by using the PCell.

Transmission of the PUSCH is performed in such a manner that the UE transmits the PUSCH to the BS by using the PCell or the SCell. Transmission of the PUCCH can be performed by using the PCell at the same time of performing transmission of the PUSCH by the UE by using the PCell at a specific time. In addition, transmission of the PUCCH can be performed by using the PCell at the same time of performing transmission of the PUSCH by the UE by using the SCell.

Figure 11:
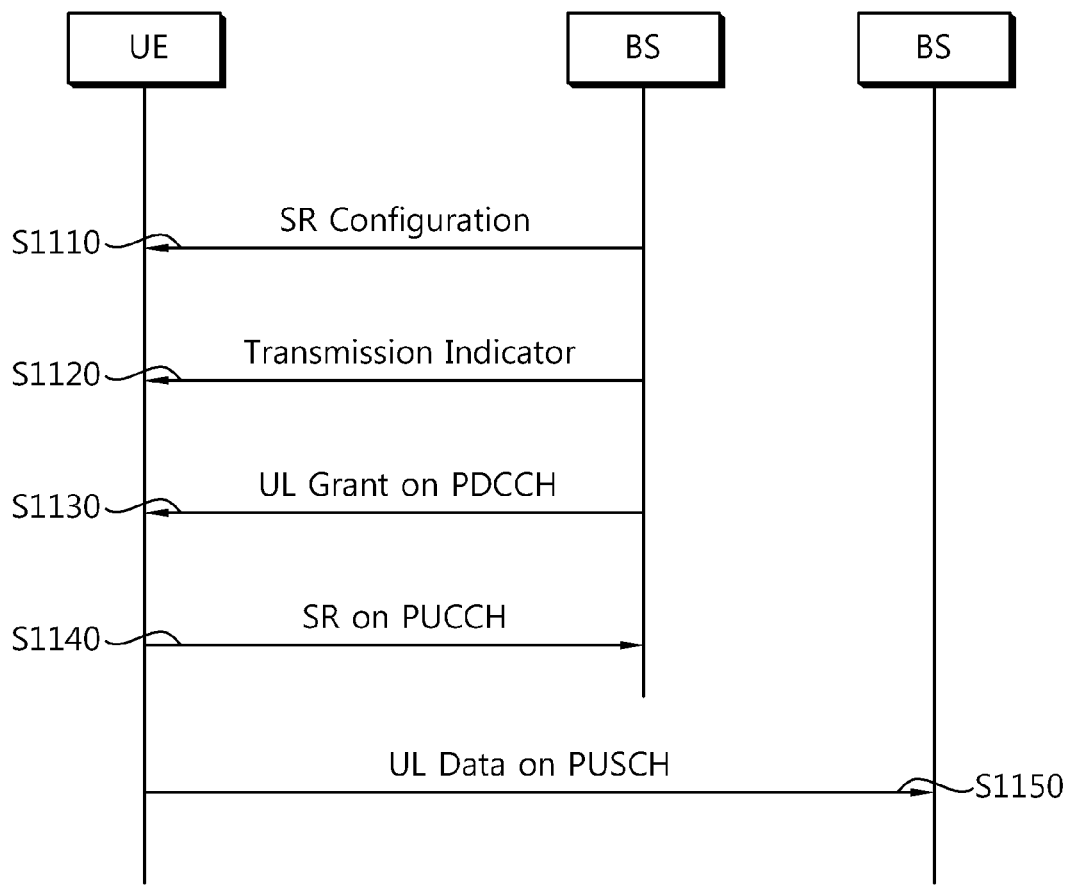
FIG. 11 is a flowchart showing SR transmission according to an embodiment of the present invention.

FIG. 11 is a flowchart showing SR transmission according to an embodiment of the present invention. Although it is shown herein that one PCell and one SCell are used, the number of SCells is not limited thereto.

A UE receives a SR configuration from the PCell (step S1110). The SR configuration may be received by using an RRC message. The SR configuration may include an SR index and a resource index indicating a PUCCH resource used for SR transmission. The SR index is information indicating an SR periodicity for SR transmission and/or a subframe offset.

The UE receives a transmission indicator from the PCell (step S1120). The transmission indicator reports that simultaneous transmission of a PUSCH and a PUCCH for the SR is enabled. The PUSCH that can be simultaneously transmitted with the SR may include at least one of a PUSCH of the PCell and a PUSCH of the SCell. The PUSCH of the SCell will be assumed in the following description. The transmission indicator may be included in the SR configuration, or may be received by using an additional message.

The UE receives a UL grant including resource allocation for the PUSCH of the SCell from the PCell on a PDCCH (step S1130). This UL grant is received irrespective of the SR. Although it is described herein that resource allocation of the SCell is scheduled by the PCell, the PUSCH of the SCell may be scheduled by the PDCCH of the SCell.

The UE triggers the SR, and transmits the SR on the PUCCH in a subframe corresponding to the SR periodicity (step S1140). The PUCCH can use a resource indicated by a resource index included in the SR configuration. The SR can be used to request a UL radio resource required, for example, for BSR transmission.

If PUSCH transmission is required in a subframe in which the SR is transmitted, UL data is transmitted on the PUSCH (step S1150). This is because simultaneous transmission of the SR and the PUSCH is enabled in advance.

Under an environment where a plurality of serving cells are present, delay of SR transmission can be avoided, and a radio resource required for transmission of UL data can be ensured more rapidly. In addition, since a procedure for confirming whether a PUSCH is transmitted for SR transmission is omitted, complexity of a UE can be reduced.

Figure 12:
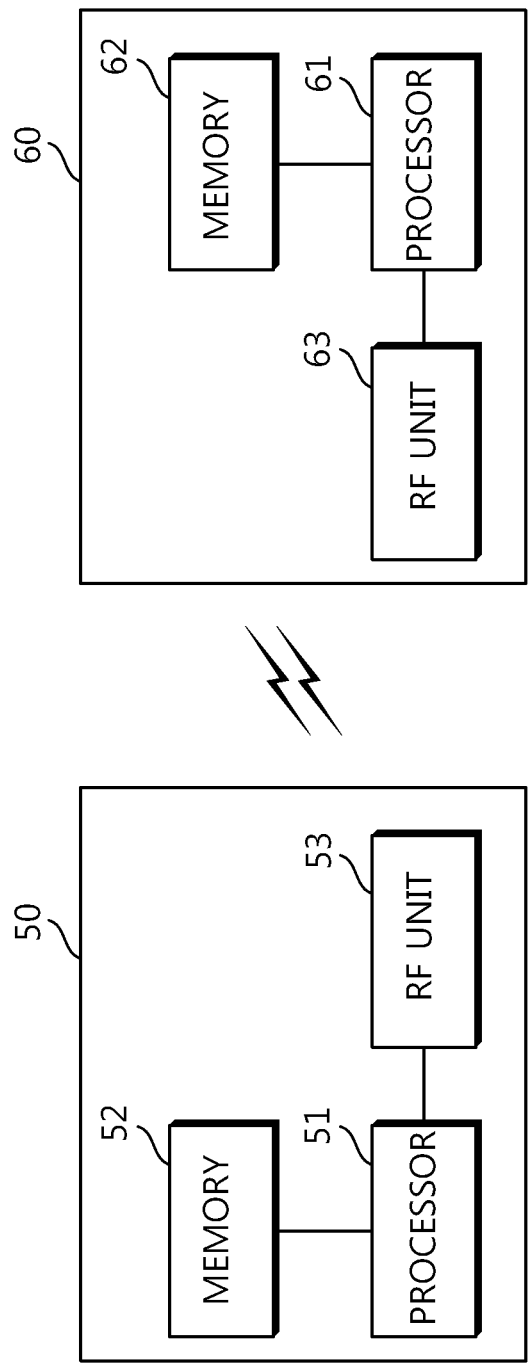
FIG. 12 is a block diagram showing a wireless communication system for implementing an embodiment of the present invention.

FIG. 12 is a block diagram showing a wireless communication system for implementing an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, processes and/or methods. The processor 51 may perform operations of BS according to the embodiment of FIG. 11.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, processes and/or methods. The processor 61 may perform operations of UE according to the embodiments of FIG. 11.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of transmitting a scheduling request (SR) to request uplink resources in a wireless communication system, the method performed by a user equipment and comprising:
receiving an SR configuration from a first serving cell, the SR configuration including a resource index and an SR index indicating a periodicity for SR transmission;
receiving a transmission indicator which enables simultaneous transmission of the SR and a physical uplink shared channel (PUSCH);
transmitting the SR to the first serving cell on a physical uplink control channel (PUCCH) in a subframe by using a resource indicated by the resource index; and
transmitting uplink data to a second serving cell on the PUSCH in the subframe,
wherein transmitting the SR on the PUCCH and transmitting the uplink data on the PUSCH are simultaneously performed in the subframe when the transmission indicator is included in the received SR configuration,
wherein a specific PUCCH format is used to transmit the SR, and
wherein the specific PUCCH format is different from a PUCCH format used to transmit at least channel quality information (CQI) or an acknowledgement/non-acknowledgment (ACK/NACK) signal for hybrid automatic repeat request (HARQ).

2. The method of claim 1, wherein the subframe is determined among subframes which belong to the periodicity for SR transmission.

3. The method of claim 1, further comprising:
receiving an uplink grant from the first serving cell or the second serving cell, the uplink grant including a resource used for the PUSCH.

4. The method of claim 3, wherein the uplink grant is received on a physical downlink control channel (PDCCH) and the SR configuration is received via a radio resource control (RRC) message.

5. The method of claim 1, wherein the PUCCH and the PUSCH use different resource blocks in the subframe.

6. The method of claim 1, wherein the transmission indicator indicates the simultaneous transmission of the SR and a PUSCH of a different serving cell.

7. The method of claim 1, wherein the first serving cell is a primary cell and the second serving cell is a secondary cell.

8. The method of claim 7, wherein the primary cell is a serving cell which is used for network entry and the secondary cell is a serving cell which is activated by the primary cell.

9. An apparatus for transmitting a scheduling request (SR) to request uplink resources in a wireless communication system, the apparatus comprising:
a radio frequency unit configured for transmitting and receiving radio signals; and
a processor operatively coupled with the radio frequency unit and configured for:
receiving an SR configuration from a first serving cell, the SR configuration including a resource index and an SR index indicating a periodicity for SR transmission;
receiving a transmission indicator which enables simultaneous transmission of the SR and a physical uplink shared channel (PUSCH);
transmitting the SR to the first serving cell on a physical uplink control channel (PUCCH) in a subframe by using a resource indicated by the resource index; and
transmitting uplink data to a second serving cell on the PUSCH in the subframe,
wherein transmitting the SR on the PUCCH and transmitting the uplink data on the PUSCH are simultaneously performed in the subframe when the transmission indicator is included in the received SR configuration,
wherein a specific PUCCH format is used to transmit the SR, and
wherein the specific PUCCH format is different from a PUCCH format used to transmit at least channel quality information (CQI) or an acknowledgement/non-acknowledgment (ACK/NACK) signal for hybrid automatic repeat request (HARQ).

10. The apparatus of claim 9, wherein the subframe is determined among subframes which belong to the periodicity for SR transmission.

11. The apparatus of claim 9, wherein the processor is further configured for receiving an uplink grant from the first serving cell or the second serving cell, the uplink grant including a resource used for the PUSCH.

12. The apparatus of claim 11, wherein the uplink grant is received on a physical downlink control channel (PDCCH) and the SR configuration is received via a radio resource control (RRC) message.

13. The apparatus of claim 9, wherein the PUCCH and the PUSCH use different resource blocks in the subframe.

14. The apparatus of claim 9, wherein the transmission indicator indicates the simultaneous transmission of the SR and a PUSCH of a different serving cell.

15. The apparatus of claim 9, wherein the first serving cell is a primary cell and the second serving cell is a secondary cell.

16. The apparatus of claim 15, wherein the primary cell is a serving cell which is used for network entry and the secondary cell is a serving cell which is activated by the primary cell.

\* \* \* \* \*